Dec. 5, 1933.  O. W. MUFF  1,938,460
ORIFICE FITTING
Filed July 23, 1931  3 Sheets-Sheet 1
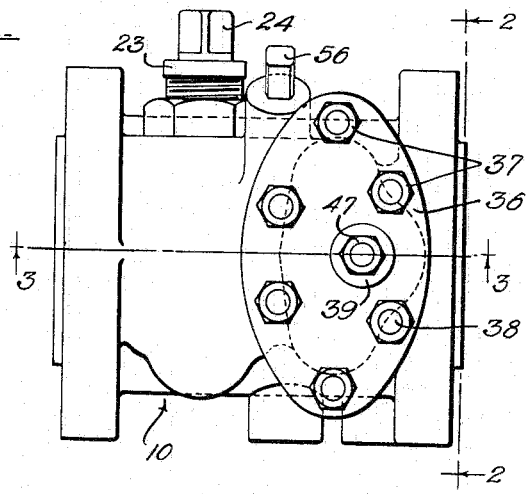
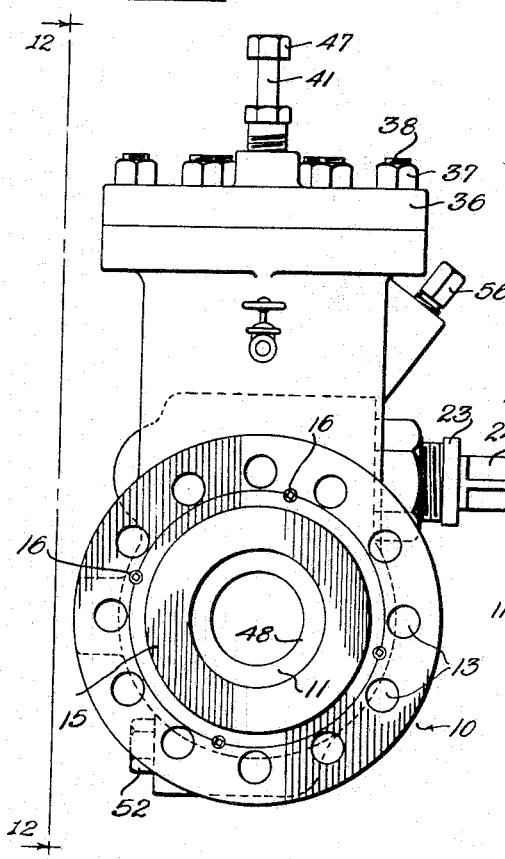
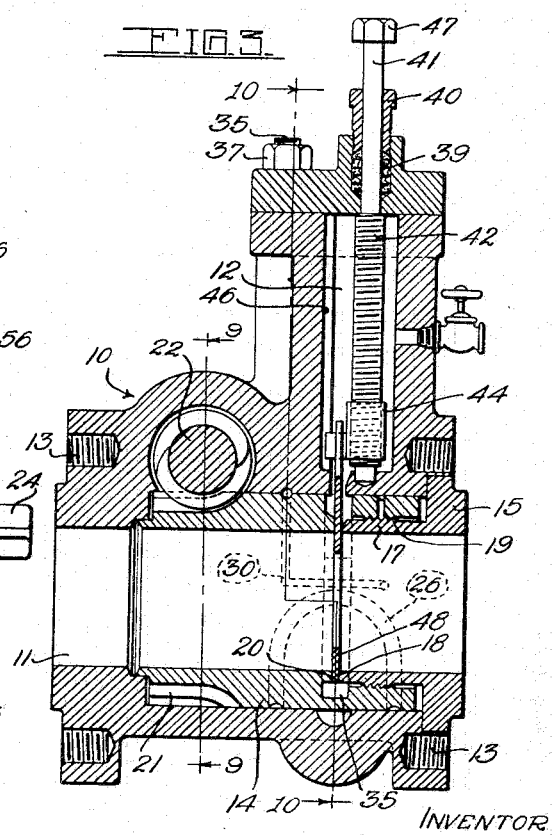
INVENTOR
O. W. MUFF
By Hazard and Miller
ATTORNEYS.

Dec. 5, 1933.   O. W. MUFF   1,938,460
ORIFICE FITTING
Filed July 23, 1931   3 Sheets-Sheet 2
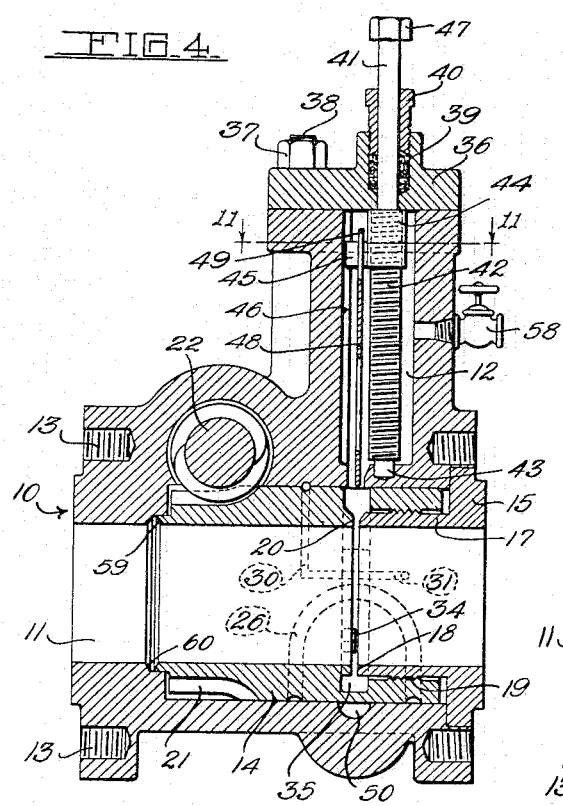
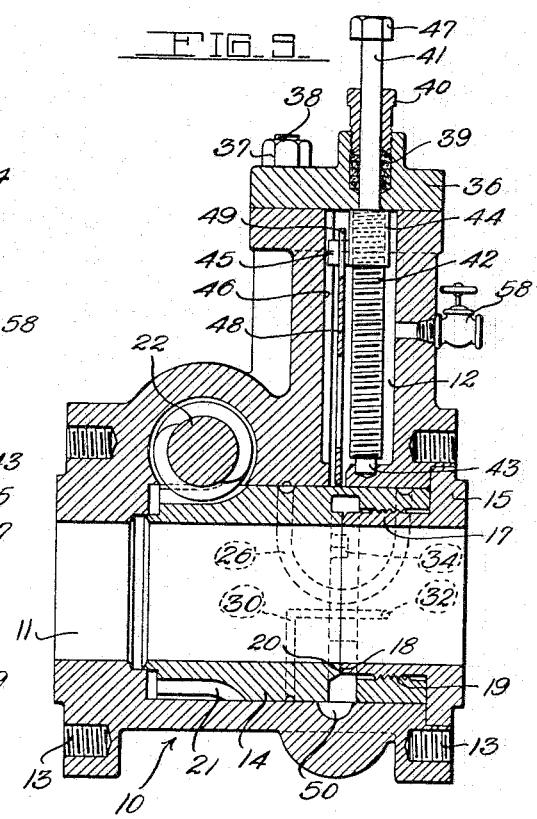
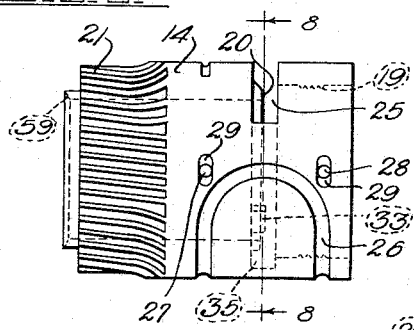
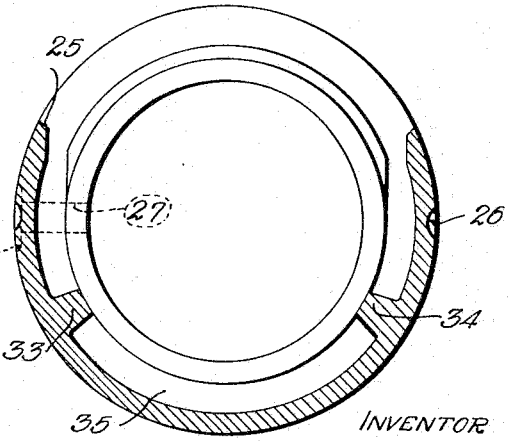
INVENTOR
O. W. MUFF
By Hazard and Miller
ATTORNEYS.

Dec. 5, 1933.                    O. W. MUFF                     1,938,460
                              ORIFICE FITTING
                          Filed July 23, 1931           3 Sheets-Sheet 3
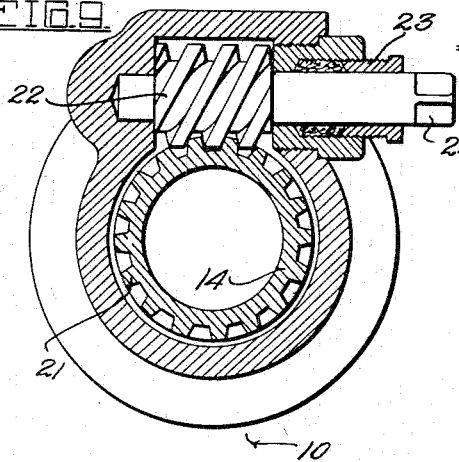
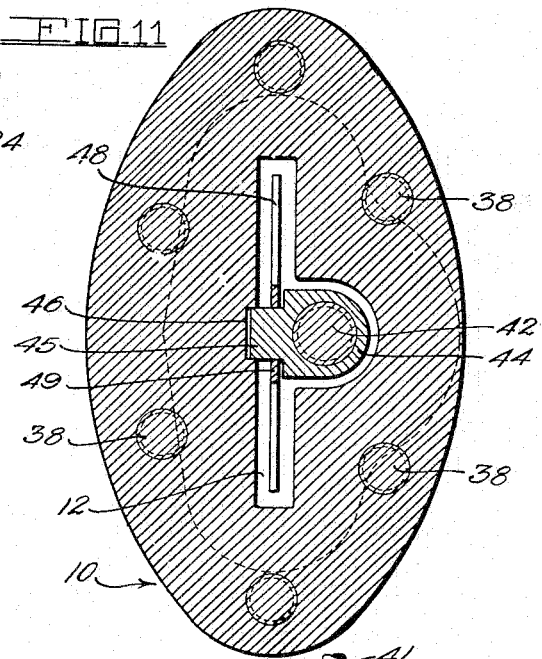
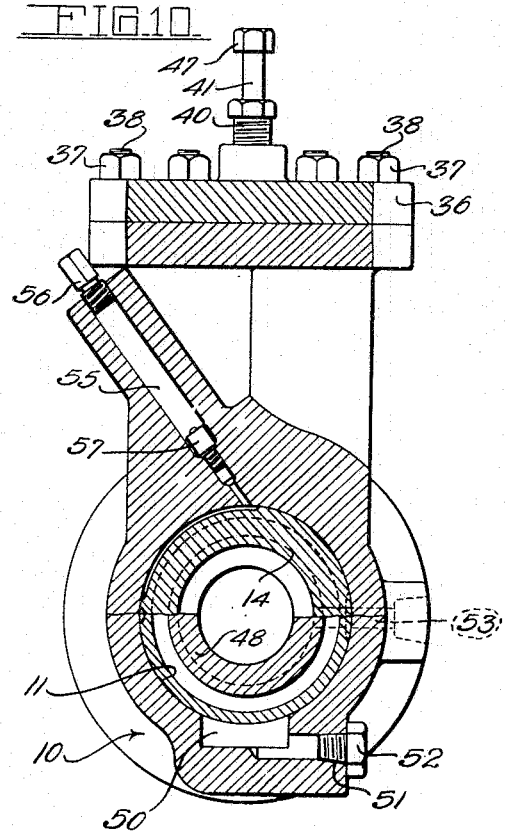
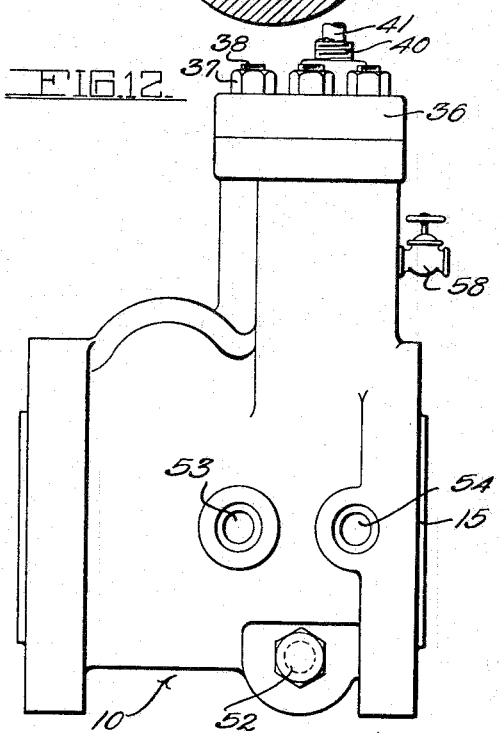
INVENTOR
O.W. MUFF
By Hazard and
   Miller
ATTORNEYS.

Patented Dec. 5, 1933

1,938,460

UNITED STATES PATENT OFFICE 1,938,460

ORIFICE FITTING

Oliver W. Muff, Los Angeles, Calif., assignor to Commercial Iron Works of Los Angeles, Los Angeles, Calif., a corporation of California Application July 23, 1931. Serial No. 552,653

23 Claims. (Cl. 137—75)

This invention relates to improvements in orifice fittings.

An object of the invention is to provide an improved form of orifice fitting consisting of a body having a bore therethrough and a laterally accessible chamber in which there may be an orifice plate which can be moved from the chamber into the bore, with a novel and convenient construction for accomplishing the movement of the orifice plate. In many of the orifice fittings heretofore designed an elevator screw or equivalent construction is used for effecting the movement of the orifice plate and such elevator screw frequently is located on the exterior of the body. Where the elevator screw is so positioned, or is threadedly mounted on the body, its rotation and screwing action results in the elevator screw moving upwardly, thus materially increasing the overall height of the fitting. In some instances such an arrangement is disadvantageous and an object of the present construction is to provide a simple, convenient and advantageous form of construction for moving the orifice plate wherein the elevator screw is rotatably mounted within the laterally accessible chamber and upon its rotation will remain at the same elevation so that the overall height of the fitting will not change.

Another object of the invention is to provide an orifice fitting comprising a body having a bore therethrough and a laterally accessible chamber with a novel, simple and efficient construction for selectively closing off the chamber from the bore when the orifice plate has been removed therefrom or opening the bore to the chamber to permit the insertion of the orifice plate and clamp it tightly in the bore in a central position. More specifically this object contemplates the use of a construction providing in effect a double closure between the bore and the chamber so as to effectively prevent leakage.

In this connection another object of the invention is to provide a means for introducing a fluid between the engaging surfaces of the secondary closure to effectively form a gas proof seal.

Another object of the invention is to provide an orifice fitting wherein there are two shoulders or faces in the bore between which the orifice plate may be positioned and clamped and to provide a construction for blowing off these shoulders or faces so that when they are moved into engagement they will be blown clean of any dirt or sediment tending to collect thereon.

Another object of the invention is to provide an orifice fitting having a sleeve threadedly mounted in the bore of the orifice fitting which accomplishes the double function of opening the chamber to the bore and clamping the orifice plate in place; and to provide a novel, simple and durable mechanism for rotating the sleeve.

Still another object of the invention is to provide a construction wherein moving parts are adequately supplied with lubricant to prevent sticking which may result from the orifice fitting remaining undisturbed over a long period of time.

With the foregoing and other objects in view, which will be made manifest in the following detailed description, and specifically pointed out in the appended claims, reference is had to the accompanying drawings for an illustrative embodiment of the invention, wherein:

Fig. 1 is a top plan view of the improved orifice fitting.

Fig. 2 is a view in end elevation of the same taken in the direction of the arrow 2 upon Figure 1.

Fig. 3 is a vertical section through the orifice fitting taken substantially upon the line 3—3 upon Figure 1, showing the orifice plate in the bore.

Fig. 4 is a view similar to Figure 3 showing the orifice plate in elevated position within the chamber prior to the closing off of the chamber from the bore.

Fig. 5 is a similar view illustrating the chamber as having been closed off from the bore.

Fig. 6 is a view in side elevation illustrating one side of the sleeve employed in the improved orifice fitting.

Fig. 7 is a view similar to Figure 6 illustrating the opposite side of the sleeve.

Fig. 8 is a vertical section taken substantially upon the line 8—8 upon Figure 6.

Fig. 9 is a vertical section taken substantially upon the line 9—9 upon Figure 3.

Fig. 10 is a compound vertical section taken substantially upon the line 10—10 upon Figure 3.

Fig. 11 is a horizontal section taken substantially upon the line 11—11 upon Figure 4.

Fig. 12 is a view in side elevation of the orifice fitting and may be considered as having been taken in the direction of the arrows 12 upon Figure 2.

Referring to the accompanying drawings, wherein similar reference characters designate similar parts throughout, the improved orifice fitting comprises a body 10 having a bore 11 therethrough and a laterally accessible chamber 12. The end faces of the body are provided with tapped holes 13 or equivalent construction providing for the attachment of the fitting on its insertion in a pipe line conveying fluid. The bore 11, as illustrated in Figures 3, 4 and 5, is of consecutively increasing diameters from left to right as viewed in these figures and within the bore there is positioned a sleeve 14 the interior of which is of the same diameter as the diameter of the extreme left end of bore 11 so as to form a smooth continuation thereof. A liner 15 is positioned within the right hand end of the bore and has a flange fitting within the enlarged end of the bore. The interior of this liner is also of the same diameter as the diameter of the left end of bore 11, thus forming a smooth continuation thereof. This liner is held in position by a plurality of keying screws 16 which are screwed into holes formed partially in the body and partially in the liner, as shown in Figure 2. The tubular extension 17 on the liner is externally threaded and provides on its inner end a seat or shoulder 18. The sleeve 14 has a tubular extension on its right hand end fitting about extension 17 which is provided with threads 19 which are complementary to and in engagement with the threads on the tubular extension 17 of liner 15. The sleeve 14 fits snugly within the body and is rotatable therein so that upon rotation of the sleeve by virtue of its threaded connection with the stationary liner 15 it will move longitudinally toward the right or toward the left as the case may be. The sleeve has a shoulder or seat 20 arranged in opposition to shoulder or seat 18 and on its extreme left end it is provided with worm teeth 21. These worm teeth extend from a point near the end of the sleeve to its extreme end, such a construction facilitating easy assembly and permitting the sleeve to move longitudinally the slight distance required during its screwing action on the liner 15. To effect rotation of the sleeve a transversely extending worm 22 is rotatably mounted in the body one end of which rotates in a suitable bearing, not shown, which is disposed within the body and the other end of which extends through a packing box, the packing gland of which is illustrated at 23. This end of the worm is made non-circular as illustrated at 24 providing for the application of a wrench.

Referring now to further details of the construction of the sleeve and particularly to Figures 6 and 7, the sleeve intermediate its ends has a slot 25 formed therein. This slot is arranged at approximately the location of the seat or shoulder 20 and extends roughly one-third of the distance around the sleeve. This slot provides for ingress to and egress from the bore, as will later be described. On the opposite side of the sleeve there is formed an annular groove 26. This groove surrounds an area which extends practically half way around the sleeve, as will be understood from an inspection of Figures 6 and 7. On one side of the sleeve there are formed a pair of apertures, these being indicated at 27 and 28, and near these apertures the sleeve is preferably gouged out or countersunk, as clearly shown in Figures 6 and 8 by the reference character 29. The apertures 27 and 28 are arranged on opposite sides of the slot 25 and the shoulder 20 so that when an orifice plate is positioned in the bore these apertures will be on opposite sides thereof. On the opposite side of the sleeve there is formed an angular groove 30, the circumferential portion of which is located adjacent slot 25. The longitudinal portion indicated at 31 extends from the circumferential portion between slot 25 and groove 26 to a radial aperture 32 which is drilled through the sleeve to threads 19. Adjacent the shoulder or seat 20 and near the bottom of the sleeve, if slot 25 is considered as being on its top, there are a pair of projecting lugs 33 and 34 which project beyond the shoulder or seat 20 and serve as abutments or stops for the orifice plate to position it properly within the bore. Except for these stops the sleeve is undercut around seat or shoulder 20 providing an annular channel 35 the ends of which communicate with the slot.

The chamber 12 is normally closed by a cover 36 fastened in place by suitable nuts 37 threaded onto studs 38 on the top of the body. This cover has a packing box 39 in which packing is disposed and compressed by means of a gland 40 and the circular shank 41 of the elevator screw 42 extends therethrough. The elevator screw 42 is disposed within the chamber 12 and has its lower end 43 fitting in a circular recess in the bottom of the chamber providing a bearing therefor. A nut 44 is screwed onto the elevator screw and carries a projecting lug 45 which is disposed in a vertical groove 46 in one side of the chamber. This lug prevents the nut from rotating with the screw so that when a wrench is applied to the non-circular upper end 47 of the shank and the screw is rotated the nut will be caused to move upwardly or to be screwed downwardly within the chamber. The lug 45 on the nut also constitutes a hanger for the orifice plate 48 which has an apertured handle 49 positioned on the hanger. This handle is of relatively narrow width as indicated in Figure 11 and when the orifice plate is in the bore of the fitting it projects upwardly through the slot 25 into the chamber, as shown in Figure 3. In the bottom of the body there is formed a recess 50 having an openable outlet 51, shown as being closed by a plug 52. This recess is in vertical alignment with slot 25 and is adapted to be opened thereby when the sleeve 14 is given a half revolution. In the side of the body there are formed a pair of apertures 53 and 54. These apertures will normally be in registration with the apertures 27 and 28 in the sleeve and in the event that apertures 27 and 28 are not in perfect registration with apertures 53 and 54 the gouged out or countersunk portions indicated at 29 preserve communication between apertures 53 and 54 and apertures 27 and 28. Apertures 53 and 54 are designed to be connected with pressure gauges or other recording instruments to measure the differentials in pressures on opposite sides of the orifice plate. In the opposite side of the body from apertures 53 and 54 there is formed a downwardly inclined bore 55 shown as being closed by a plug 56 and having therein a ball check valve 57. The end of this bore terminates on top of the sleeve and when the sleeve has been rotated into a position wherein annular groove 26 is uppermost this bore will communicate therewith. When the slot 25 in the sleeve is uppermost bore 55 communicates with the circumferential portion 30 of the angular groove on the sleeve.

The operations and advantages of the improved orifice fitting are as follows. If the orifice fitting is in the position shown in Figure 3 and it is desired to replace the orifice plate 48 with another orifice plate having an orifice of different size, a wrench is first applied to the non-circular end 24 on the worm. The worm is given a slight rotation to cause the sleeve 14 to rotate reversely or unscrew from liner 15. This movement need be but very slight and its purpose is to merely loosen the orifice plate from between the opposed shoulders 18 and 20. A wrench is then applied to the non-circular head 47 and the elevator screw 42 is rotated effecting a lifting of the nut 44 which lifts the orifice plate 48 from within the bore into the chamber. When the orifice plate has been completely lifted into the chamber, the worm 24 is rotated in the opposite direction, rotating sleeve 14 and causing it to be screwed toward the right on liner 15. The pitch of threads 19 is preferably exactly double the thickness of the orifice plate so that one-half revolution of the sleeve 14 will cause it to move toward the right a longitudinal distance exactly equal to the thickness of the orifice plate. The sleeve having been given a half revolution causes slot 25 to assume a bottom position, as shown in Figure 5, and the imperforate area within annular groove 26 to assume an uppermost position wherein it closes off the entrance to the chamber 12. At the same time shoulder 18 will be engaged by shoulder 20 and these engaging shoulders form a primary closure between the bore 11 and the chamber 12. The imperforate surface within the annular groove 26 covering the entrance to the chamber forms a secondary closure and a gas proof seal is effected by forcing a fluid, such as grease, through bore 55 into the annular groove 26. When the annular groove 26 is filled with grease it forms an effective grease seal, preventing any escape of gas from within bore 11 into chamber 12. The release valve 58 is then opened to release the pressure entrapped within chamber 12 and reduce the pressure in the chamber to atmospheric. Thereafter the nuts 37 can be removed and the closure 36 lifted off of the body, carrying with it the elevator screw, the nut and the orifice plate 48. Orifice plate 48 is then removed laterally from the hanger 45 and a new orifice plate is substituted therefor. The cover 36 is then replaced, positioning the pin 43 in its bearing, and the worm 22 is then rotated to reversely rotate the sleeve one-half rvolution or thereabouts. This opens up chamber 12 to the bore again and thereafter the elevator screw 42 can be rotated to lower the orifice fitting into the space between shoulders 20 and 18. The worm 22 can then be rotated to back up the sleeve until shoulders 20 and 18 clamp firmly on the orifice plate. In this position of the sleeve wherein the slot 25 is uppermost the circumferential portion 30 of the angular groove is beneath the end of bore 55. Grease can be forced through the bore, through the groove, and through the radial aperture 32 to lubricate threads 19. The grease which was previously supplied to annular groove 26 is wiped onto the interior of the body during the revolution of the sleeve and lubricant is thus supplied to the engaging surfaces between the sleeve and the body.

If at any time it is suspected that the shoulders 20 and 18 might be dirty because of the accumulation of sediment, these can be effectively blown clean by removing or loosening plug 52 and loosening the sleeve from the orifice plate or from engagement with shoulder 18 slightly. The internal pressure within the bore 11 escaping between the shoulders or between each shoulder and the orifice plate blows these shoulders clean and carries the dirt into the cavity 50, from which it can be removed. In order to prevent any dirt accumulating between the left hand end of sleeve 14 and the small end of bore 11 the end of the sleeve is preferably beveled as indicated at 59 and the opposing surface on the body is likewise beveled as indicated at 60 so that as the sleeve is backed off of liner 15 these beveled surfaces will cooperate to work the dirt collected therebetween out into the bore or into the stream of fluid flow.

It will be readily appreciated by the above construction that a novel advantageous orifice fitting has been developed which is of relatively simple construction permitting ease of manufacture in that most of the machine work involved can be accomplished on a lathe. The device can be easily disassembled for replacement or repair whenever necessary by merely removing the liner 15 which permits the sleeve to be withdrawn endwise from the large end of bore 11. The construction is such as to be of relatively compact design and rotation of the elevator screw does not increase the overall height of the orifice fitting. It will also be noted that the construction of the sleeve is such that it accomplishes a plurality of functions, namely to open the chamber 12 to bore 11, to close off chamber 12 from bore 11, to permit the formation of a gas proof seal about the entrance to chamber 12, and to permit lubrication of its threads 19. By proper manipulation the orifice fitting is in effect self-cleaning. This reduction in the number of moving parts and the causing of certain parts to accomplish a plurality of functions not only reduces the cost of manufacture but also the wear and replacement cost.

Various changes may be made in the details of construction without departing from the spirit or scope of the invention as defined by the appended claims.

I claim:

1. An orifice fitting comprising a body having a bore therethrough and a laterally accessible chamber, an orifice plate adapted to be positioned in the bore or removed therefrom into the chamber, and a rotatable sleeve having a slot adapted to establish communication between the bore and the chamber, said sleeve upon rotation being adapted to shut off the bore from the chamber.

2. An orifice fitting comprising a body having a bore therethrough and a laterally accessible chamber, an orifice plate adapted to be positioned in the bore or removed therefrom into the chamber, a rotatable sleeve having a slot adapted to establish communication between the bore and the chamber, said sleeve upon rotation being adapted to shut off the bore from the chamber, said sleeve presenting on its exterior surface an annular groove which when the sleeve is in closing position is adapted to surround the entrance to the chamber, and means for supplying liquid to the groove to effect a seal.

3. An orifice fitting comprising a body having a bore therethrough and a laterally accessible chamber, a sleeve in the body having a slot therein and adapted upon rotation to open and close the chamber from the bore, an orifice plate adapted to be moved through the slot from the chamber into the bore or in the opposite direction, means providing an annular shoulder in the bore against which the orifice plate may be forced, said sleeve presenting an opposing shoulder, and means for causing the sleeve to move longitudinally in the bore to cause the orifice plate to be clamped between the shoulders.

4. An orifice fitting comprising a body having a bore therethrough and a laterally accessible chamber, a sleeve in the body having a slot therein and adapted upon rotation to open and close the chamber from the bore, an orifice plate adapted to be moved through the slot from the chamber into the bore or in the opposite direction, and means providing an annular shoulder in the bore against which the orifice plate may be forced, said sleeve presenting an opposing shoulder, said sleeve having threads engageable with stationary threads whereby on rotating the sleeve the sleeve will move longitudinally to clamp the orifice plate between the shoulders.

5. An orifice fitting comprising a body having a bore and a laterally accessible chamber, a rotatable sleeve within the bore having a slot adapted to open the chamber to the bore, a stationary liner disposed within the bore having a threaded connection with the sleeve, means for rotating the sleeve, and an orifice plate adapted to be moved from the chamber into the bore through the slot or from the bore into the chamber, said sleeve and liner presenting opposed shoulders adapted to clamp upon the orifice plate or to engage each other upon rotation of the sleeve.

6. An orifice fitting comprising a body having a bore and a laterally accessible chamber, a rotatable sleeve within the bore having a slot adapted to open the chamber to the bore, and an orifice plate having a handle of reduced width and adapted to be positioned in the bore through the slot from the chamber with the handle extending upwardly in the chamber, said sleeve being adapted to close the chamber from the bore upon rotation of the sleeve when the orifice plate is positioned wholly within the chamber.

7. An orifice fitting comprising a body having a bore and a laterally accessible chamber, a rotatable sleeve within the bore having a slot adapted to open the chamber to the bore, an orifice plate having a handle of reduced width and adapted to be positioned in the bore through the slot from the chamber with the handle extending upwardly in the chamber, said sleeve being adapted to close the chamber from the bore upon rotation of the sleeve when the orifice plate is positioned wholly within the chamber, said sleeve presenting on its exterior on the opposite side from the slot an annular groove which when the sleeve is in closing position surrounds the entrance to the chamber, and means for supplying said groove with a fluid to effect a gas proof seal.

8. An orifice fitting comprising a body having a bore therethrough and a laterally accessible chamber, a sleeve in the bore having a slot adapted to open the chamber to the bore, said sleeve being longitudinally movable in the bore and being adapted upon movement to close the chamber from the bore, and an orifice plate adapted to be moved from the chamber into the bore through the slot or removed therefrom.

9. An orifice fitting comprising a body having a bore therethrough and a laterally accessible chamber, a sleeve rotatable in the bore, said sleeve having threads and a shoulder, means providing complementary threads and a shoulder stationary with respect to the body, said complementary threads being in engagement with the threads on the sleeve, an orifice plate adapted to be moved from the chamber into the bore and positioned between said shoulders to be clamped therebetween or removed from the bore into the chamber, and means for rotating the sleeve to cause the orifice plate to be clamped between the shoulders or to cause the shoulders to engage when the orifice plate is removed to effect a primary closure between the chamber and bore, said sleeve presenting an external surface which closes over the entrance to the chamber when the shoulders are in engagement to effect a second closure between the chamber and bore.

10. An orifice fitting comprising a body having a bore therethrough and a laterally accessible chamber, a sleeve rotatable in the bore, said sleeve having threads and a shoulder, means providing complementary threads and a shoulder stationary with respect to the body, said complementary threads being in engagement with the threads on the sleeve, an orifice plate adapted to be moved from the chamber into the bore and positioned between said shoulders to be clamped therebetween or removed from the bore into the chamber, means for rotating the sleeve to cause the orifice plate to be clamped between the shoulders or to cause the shoulders to engage when the orifice plate is removed to effect a primary closure between the chamber and bore, said sleeve presenting an external surface which closes over the entrance to the chamber when the shoulders are in engagement to effect a second closure between the chamber and bore, there being an annular groove in said surface which surrounds the entrance to the chamber when the chamber is closed, and means for supplying said groove with fluid to effect a gas proof seal.

11. An orifice fitting comprising a body having a bore therethrough and a laterally accessible chamber, a sleeve having a shoulder threadedly mounted in the bore, a shoulder in the bore arranged in opposition to the sleeve, means for rotating the sleeve, there being a slot in the sleeve, and an orifice plate adapted to be moved from the chamber into the bore between the shoulders through the slot or from the bore into the chamber, said sleeve upon rotation being adapted to close the bore from the chamber.

12. An orifice fitting comprising a body having a bore therethrough and a laterally accessible chamber, a sleeve having a shoulder threadedly mounted in the bore, a shoulder in the bore arranged in opposition to the sleeve, means for rotating the sleeve, there being a slot in the sleeve, an orifice plate adapted to be moved from the chamber into the bore between the shoulders through the slot or from the bore into the chamber, said sleeve upon rotation being adapted to close the bore from the chamber, and means for supplying a lubricant to the threads when the slot is in chamber opening position.

13. An orifice fitting comprising a body having a bore therethrough and a laterally accessible chamber, a sleeve having a shoulder threadedly mounted in the bore, a shoulder in the bore arranged in opposition to the sleeve, means for rotating the sleeve, there being a slot in the sleeve, an orifice plate adapted to be moved from the chamber into the bore between the shoulders through the slot or from the bore into the chamber, said sleeve upon rotation being adapted to close the bore from the chamber, there being a groove formed on the exterior of the sleeve and an aperture leading therefrom to the threads, and means for supplying said groove with a lubricant when the slot is in chamber opening position to lubricate the threads.

14. An orifice fitting comprising a body having a bore and a laterally accessible chamber, means providing a shoulder in the bore, a longitudinally movable sleeve in the bore, an orifice plate adapted to be moved from the chamber to the bore between the shoulder and sleeve and adapted to be clamped therebetween, and means providing an openable outlet from the body between the shoulder and sleeve whereby by opening the outlet and loosening the sleeve loose dirt tending to collect on the shoulder and sleeve may be blown out.

15. An orifice fitting comprising a body having a bore and a laterally accessible chamber, a shoulder in the bore, a sleeve threadedly mounted in the bore having a slot adapted to open the chamber to the bore, a shoulder in opposition to the mentioned shoulder, an orifice plate adapted to be moved from the chamber through the slot to a position between the shoulders, means providing an openable outlet from the body on the opposite side of the bore from the chamber, and means for rotating the sleeve to cause the shoulders to engage, to close the chamber and to position the slot opposite the openable outlet whereby upon opening the outlet and disengaging the shoulders slightly the shoulders may be blown clean.

16. An orifice fitting comprising a body having a bore therethrough and a laterally accessible chamber, an orifice plate adapted to be positioned in the bore or removed therefrom into the chamber, and a slotted member movably mounted in the bore adapted to optionally open or close the chamber to and from the bore.

17. An orifice fitting comprising a body having a bore therethrough and a laterally accessible chamber, an orifice plate adapted to be positioned in the bore or removed therefrom into the chamber, a slotted member movably mounted in the bore adapted to optionally open or close the chamber to and from the bore, and means for moving the orifice plate from the chamber into the bore through the slot or in the opposite direction.

18. An orifice fitting comprising a body having a bore therethrough and a laterally accessible chamber, an orifice plate adapted to be positioned in the bore or removed therefrom into the chamber, a slotted member movably mounted in the bore adapted to optionally open or close the chamber to and from the bore, and means for moving the slotted member.

19. An orifice fitting comprising a body having a bore therethrough and a laterally accessible chamber, an orifice plate adapted to be positioned in the bore or removed therefrom into the chamber, and a slotted sleeve movably mounted in the bore adapted upon movement to optionally open or close the chamber to and from the bore.

20. An orifice fitting comprising a body having a bore therethrough and a laterally accessible chamber, an orifice plate adapted to be positioned in the bore or removed therefrom into the chamber, and a slotted sleeve rotatably mounted in the bore adapted upon rotation to optionally open or close the chamber to and from the bore.

21. An orifice fitting comprising a body having a bore therethrough and a laterally accessible chamber, an orifice plate adapted to be positioned in the bore or removed therefrom into the chamber, a slotted member movably mounted in the bore adapted to optionally open or close the chamber to and from the bore, there being channels surrounding the entrance to the chamber when the slotted member is in closing position adapted to receive a fluid under pressure.

22. An orifice fitting comprising a body having a bore therethrough and a laterally accessible chamber, an orifice plate adapted to be positioned in the bore or removed therefrom into the chamber, and a slotted sleeve movably mounted in the bore adapted upon movement to optionally open or close the chamber to and from the bore, there being channels on the sleeve surrounding the entrance to the chamber when the sleeve is in closing position adapted to receive a fluid under pressure.

23. An orifice fitting comprising a body having a bore therethrough and a laterally accessible chamber, an orifice plate adapted to be positioned in the bore or removed therefrom into the chamber, and a slotted sleeve rotatably mounted in the bore adapted upon rotation to optionally open or close the chamber to and from the bore, there being channels on the sleeve surrounding the entrance to the chamber when the sleeve is in closing position adapted to receive a fluid under pressure.

OLIVER W. MUFF.